US008212171B2

(12) United States Patent
Soloff

(10) Patent No.: US 8,212,171 B2
(45) Date of Patent: Jul. 3, 2012

(54) SYSTEM AND METHOD FOR ULTRASONIC ASSISTED EDM MACHINING

(75) Inventor: Robert S. Soloff, Woodbury, CT (US)

(73) Assignee: Sonics & Materials Inc., Newtown, CT (US)

( * ) Notice: Subject to any disclaimer, the term of this patent is extended or adjusted under 35 U.S.C. 154(b) by 1195 days.

(21) Appl. No.: 11/964,235

(22) Filed: Dec. 26, 2007

(65) Prior Publication Data

US 2009/0166335 A1   Jul. 2, 2009

Related U.S. Application Data

(60) Provisional application No. 60/871,691, filed on Dec. 22, 2006.

(51) Int. Cl.
*B23H 5/00* (2006.01)
*B23H 9/10* (2006.01)

(52) U.S. Cl. .................. 219/69.2; 219/69.17
(58) Field of Classification Search ............ 219/69.11, 219/69.17, 69.2; 310/323.19; 451/165; 29/889.7, 29/889.71, 889.72, 889.721
See application file for complete search history.

(56) References Cited

U.S. PATENT DOCUMENTS

| 4,364,783 A * | 12/1982 | Theodore et al. ............ 156/69 |
| 4,393,292 A | 7/1983 | Inoue |
| 4,485,286 A * | 11/1984 | Inoue ..................... 219/69.17 |
| 5,443,240 A | 8/1995 | Cunningham |
| 5,739,497 A * | 4/1998 | Tanaka .................... 219/69.14 |
| 5,931,367 A * | 8/1999 | Sato et al. .................. 228/1.1 |
| 6,078,125 A * | 6/2000 | Roberts ................. 310/323.19 |
| 6,669,074 B2 * | 12/2003 | Sato .......................... 228/1.1 |
| 6,734,384 B2 | 5/2004 | Barbulescu |
| 2007/0170820 A1 * | 7/2007 | Bromfield ................... 310/364 |

FOREIGN PATENT DOCUMENTS

| DE | 102004041780 A1 * | 3/2006 |
| EP | 0366466 A1 | 5/1990 |
| JP | 62-176713 A * | 8/1987 |
| JP | 2-152729 A * | 6/1990 |

OTHER PUBLICATIONS

International Search Report, PCT/US07/26458, Feb. 25, 2008, 3 pages.
Written Opinion of the International Searching Authority, PCT/US07/26458, 7 pages.

* cited by examiner

*Primary Examiner* — Geoffrey S Evans
(74) *Attorney, Agent, or Firm* — St. Onge Steward Johnston & Reens LLC

(57) ABSTRACT

A system for ultrasonic assisted electrical discharge machining of a component part having a longitudinal axis, a half wavelength resonant frequency along the longitudinal axis and an attachment portion, is provided. The system includes an ultrasonic horn having a longitudinal axis, a half wavelength resonant frequency along the longitudinal axis and an attachment portion. The half wavelength resonant frequency of the ultrasonic horn is the same as the half wavelength resonant frequency of the component part. Additionally, one of the attachment portion of the component part and the attachment portion of the ultrasonic horn is a male part and the other one of the attachment portion of the component part and the attachment portion of the ultrasonic horn is a female part sized and shaped to mate and engage one another when the component part and the ultrasonic horn are at generally the same temperature.

24 Claims, 2 Drawing Sheets

HALF WAVE LENGTH TURBINE BLADE

HALF WAVE LENGTH HORN

SYSTEM AND METHOD FOR ULTRASONIC ASSISTED EDM MACHINING

CROSS-REFERENCE TO RELATED APPLICATIONS

This patent application claims the benefit of, under Title 35, United States Code, Section 119(e), U.S. Provisional Patent Application No. 60/871,691, filed Dec. 22, 2006.

FIELD OF THE INVENTION

The present invention relates generally to the field of electrical discharge machining ("EDM machining"), and more particularly to a system and method which incorporates ultrasonics to assist in the formation of parts, such as turbine blades, using EDM machining.

BACKGROUND OF THE INVENTION

The machining of small holes in an alloy steel turbine blade is often currently being done using an EDM machining process, in which the electrolyte used is typically deionized water (DI water). While such process provides several advantages over other known alternatives, as is known, the process can be quite slow. For example, in a typical turbine blade, there are as many as 50-100 holes required for each blade, and the time required to drill them is quite long. However, it has been shown that when ultrasonic energy is added to an EDM machining process the speed of material removal is increased. Therefore, applying ultrasonic energy to the turbine blade reduces the EDM machining time.

However, the problem exists as to how to efficiently couple ultrasonic energy to the blade. One alternative is to clamp the blade to the face of a half wavelength resonant horn. However, this is a very difficult task to accomplish because the combination of the horn, blade and clamp must sustain the ultrasonic vibrations. Problematically, the forces from the ultrasonic vibration tend to shake the clamp and horn apart after only a few seconds of operation.

Another alternative to vibrate the blade is to place the blade in a cavity machined into the horn face and pour epoxy into the cavity in order to hold the blade in place after the epoxy is cured. However, this requires that the horn, blade and epoxy all have to be at a set resonant frequency, which is not easily accomplished. Also, after one is finished with the machining operation the epoxy must be removed, also not an easy task to accomplish.

A more effective method of coupling the blade to the horn is to first determine the resonant half wavelength of the blade and directly drive it with a matching horn of the same frequency. However, the problem still exists as to how to attach the blade to the horn. The present invention addresses this problem.

SUMMARY OF THE INVENTION

More specifically, in accordance with a first aspect of the present invention, a system for ultrasonic assisted electrical discharge machining of a component part having a longitudinal axis, a half wavelength resonant frequency along the longitudinal axis and an attachment portion, is provided. The system includes an ultrasonic horn having a longitudinal axis, a half wavelength resonant frequency along the longitudinal axis and an attachment portion. The half wavelength resonant frequency of the ultrasonic horn is the same as the half wavelength resonant frequency of the component part. Additionally, one of the attachment portion of the component part and the attachment portion of the ultrasonic horn comprises a male part and the other one of the attachment portion of the component part and the attachment portion of the ultrasonic horn comprises a female part sized and shaped to mate and engage one another when the component part and the ultrasonic horn are at generally the same temperature.

In some embodiments, the female part has generally the same shape as and smaller dimensions than the male part when the component part and the ultrasonic horn are at generally the same temperature.

In some embodiments, the one of the component part and the ultrasonic horn whose attachment portion comprises the female part is formed of a material having a greater coefficient of thermal expansion than does the one of the component part and the ultrasonic horn whose attachment portion comprises the male part. In certain of these embodiments, the attachment portion of the component part comprises the male part and the attachment portion of the ultrasonic horn comprises the female part. In certain of these embodiments, the component part comprises a turbine blade and the male part comprises a tang. In certain embodiments, the component part is formed from steel and the ultrasonic horn is formed from titanium or aluminum.

In some embodiments, the attachment portion of the component part is disposed along the longitudinal axis of the component part. In certain of these embodiments, the attachment portion of the ultrasonic horn is disposed along the longitudinal axis of the ultrasonic horn. In certain of these embodiments, the longitudinal axis of the component part and the longitudinal axis of the ultrasonic horn are coaxial.

In some embodiments, the system further includes a source of ultrasonic energy which imparts ultrasonic vibrations to the ultrasonic horn.

In accordance with another aspect of the present invention, a method for ultrasonic assisted electrical discharge machining comprises the steps of: (i) providing a component part having a longitudinal axis, a half wavelength resonant frequency along the longitudinal axis and an attachment portion; (ii) providing an ultrasonic horn having a longitudinal axis, a half wavelength resonant frequency along the longitudinal axis and an attachment portion, wherein the half wavelength resonant frequency of the ultrasonic horn is the same as the half wavelength resonant frequency of the component part, and wherein one of the attachment portion of the component part and the attachment portion of the ultrasonic horn comprises a male part and the other one of the attachment portion of the component part and the attachment portion of the ultrasonic horn comprises a female part sized and shaped to mate and engage one another when the component part and the ultrasonic horn are at generally the same temperature; (iii) mating the male part and the female part together to join the component part and the ultrasonic horn; and (iv) ultrasonically vibrating the ultrasonic horn and the component part joined thereto at the half wavelength resonant frequency of the ultrasonic horn and the component part.

In some embodiments, the female part has generally the same shape as and smaller dimensions than the male part when the component part and the ultrasonic horn are at generally the same temperature.

In some embodiments, the one of the component part and the ultrasonic horn whose attachment portion comprises the female part is formed of a material having a greater coefficient of thermal expansion than does the one of the component part and the ultrasonic horn whose attachment portion comprises the male part, and the mating step comprises the steps of: (a) heating the component part and the ultrasonic horn such that the female part expands to a greater extent that the male part expands; (b) fitting the male part into the female part; and (c) cooling the component part and the ultrasonic horn such that the female part and the male part shrink such that the male part is engaged within the female part.

In certain of these embodiments, the attachment portion of the component part comprises the male part and wherein the attachment portion of the ultrasonic horn comprises the female part. In certain embodiments, the component part comprises a turbine blade and the male part comprises a tang. In certain embodiments, the component part is formed from steel and the ultrasonic horn is formed from titanium or aluminum.

In some embodiments, the attachment portion of the component part is disposed along the longitudinal axis of the component part. In certain of these embodiments, the attachment portion of the ultrasonic horn is disposed along the longitudinal axis of the ultrasonic horn. In certain embodiments, the longitudinal axis of the component part and the longitudinal axis of the ultrasonic horn are coaxial.

In some embodiments, the step of ultrasonically vibrating the ultrasonic horn is performed by a source of ultrasonic energy which imparts ultrasonic vibrations to the ultrasonic horn.

The invention and its particular features and advantages will become more apparent from the following detailed description considered with reference to the accompanying drawings.

DETAILED DESCRIPTION OF THE INVENTION

Figure 1:
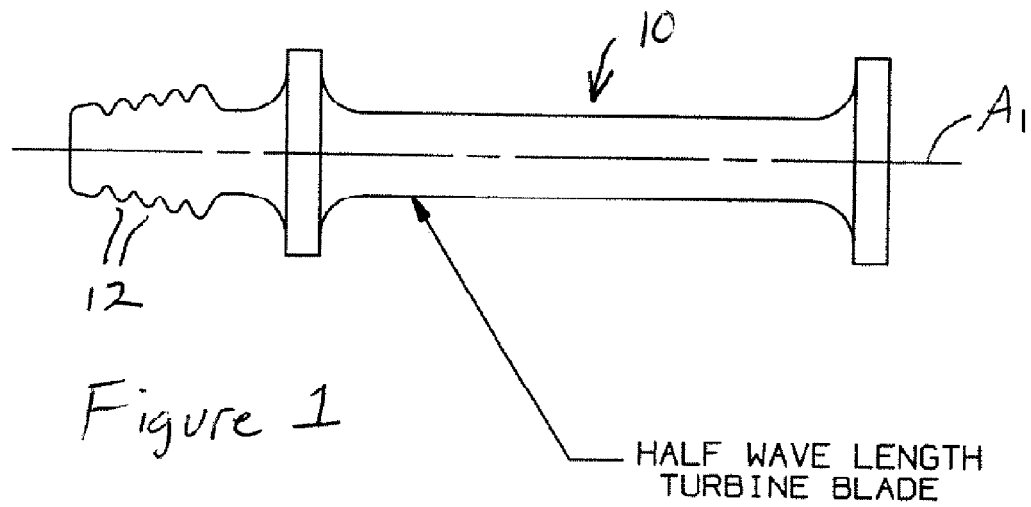
FIG. 1 is a schematic view of a component part, particularly a turbine blade, in connection with which the system of the present invention may be used for ultrasonic assisted electrical discharge machining.
Figure 2:
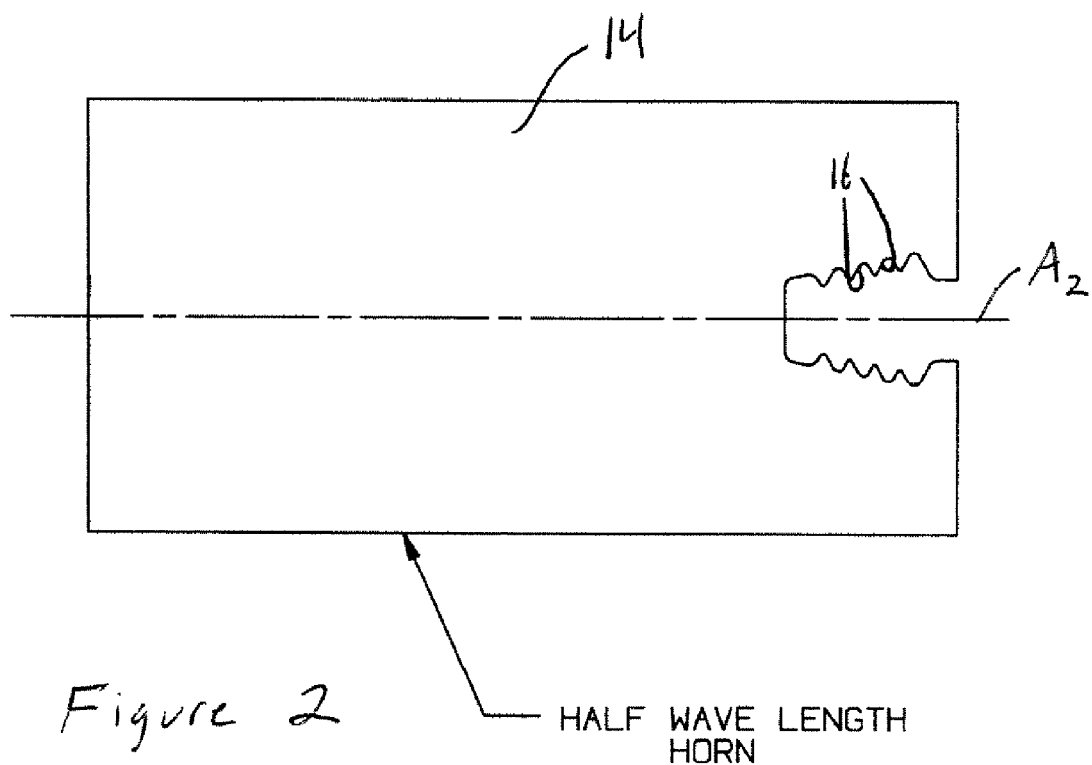
FIG. 2 is a schematic view of an ultrasonic horn portion of the system for ultrasonic assisted electrical discharge machining of the present invention.

The present invention stems from the fact that every turbine blade 10 (shown schematically in FIG. 1) has tangs 12 at one end that are used to attach it to a rotating shaft (not shown) after manufacture of the blade 10. Applicant has discovered that attachment of the blade 10 to a horn can be accomplished by making a horn 14 (shown schematically in FIG. 2) having the same resonant frequency as the turbine blade 10 with slightly smaller mating female tangs 16, as compared to the male tangs 14 of the blade 12, which are then heated to capture the tangs 12 of the blade 10 by fitting the blade 10 at the output end of the horn 14.

The horn 14 may be made from either titanium or aluminum, for example, since both of these metals have a greater coefficient of expansion than the steel turbine blades 10. To accomplish the inventive attachment method, the horn 14 is heated up to expand the mating section thereof (i.e., the female tangs 16) so that the mating section of the blade 10 (i.e., the male tangs 12) can be slipped into place, and then the horn 14 is cooled to get a shrink fit on the turbine tangs 12 (as shown schematically in FIG. 3). This holds the blade 10 in place during the machining operation.

After machining, heating the horn 14 expands the horn 14 and allows the blade 10 to be easily removed. All of the methods described would typically involve the blade 10 and horn 14 being submerged in DI water.

Preferably, the blade 10 has a longitudinal axis $A_1$, and the horn 14 has a longitudinal axis $A_2$. Most preferably, the male tang 12 of the blade 10 is disposed along the longitudinal axis $A_1$ of the blade 10, and the female tang 16 of the horn 14 is disposed along the longitudinal axis $A_2$ of the horn 14. It is also preferable if the longitudinal axis $A_1$ of the blade 10 and the longitudinal axis $A_2$ of the horn 14 are coaxial when the two are joined (as shown in FIG. 3).

Figure 3:
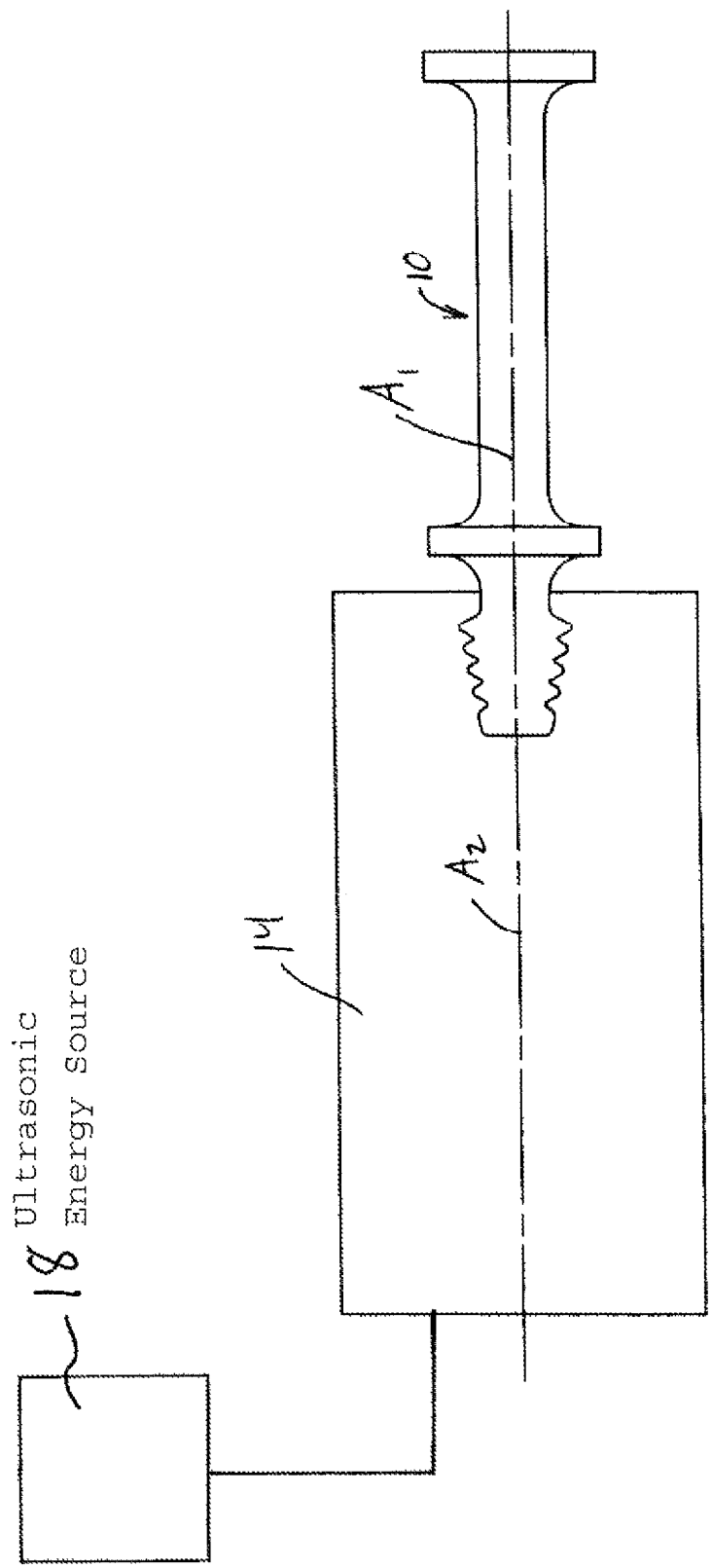
FIG. 3 is a schematic view of the component part of FIG. 1 joined with the ultrasonic horn of FIG. 2, as well as additional portions of the system for ultrasonic assisted electrical discharge machining of the present invention.

As will be immediately recognized by those skilled in the art, the system further includes a source of ultrasonic energy 18 which imparts ultrasonic vibrations to the horn 14 (also as shown schematically in FIG. 3).

Although the invention has been described with reference to a particular arrangement of parts, features and the like, these are not intended to exhaust all possible arrangements or features, and indeed many other modifications and variations will be ascertainable to those of skill in the art. For example, although the component part is described above as being a blade 10, the system of the present invention could readily be adapted to work with various other component parts.

What is claimed is:

1. A system for ultrasonic assisted electrical discharge machining of a component part having a longitudinal axis, a half wavelength resonant frequency along the longitudinal axis and an attachment portion, the system comprising:
    an ultrasonic horn having a longitudinal axis, a half wavelength resonant frequency along the longitudinal axis and an attachment portion;
    wherein the half wavelength resonant frequency of the ultrasonic horn is provided to match the half wavelength resonant frequency of the component part;
    wherein one of the attachment portion of the component part and the attachment portion of the ultrasonic horn comprises a male part and the other one of the attachment portion of the component part and the attachment portion of the ultrasonic horn comprises a female part sized and shaped to mate and engage one another when the component part and the ultrasonic horn are at generally the same temperature;
    wherein the female part is formed of a material having a greater coefficient of thermal expansion than does the male part;
    wherein the attachment portion of the ultrasonic horn comprises a female part and is adapted to receive a male part of the component part; and
    wherein the ultrasonic horn is formed from one of titanium and aluminum and is adapted to receive a component part formed from steel.

2. The system of claim 1 wherein the female part has generally the same shape as and smaller dimensions than the male part when the component part and the ultrasonic horn are at generally the same temperature.

3. The system of claim 1 wherein the ultrasonic horn is adapted to receive a turbine blade having tangs.

4. The system of claim 1 further comprising a source of ultrasonic energy which imparts ultrasonic vibrations to the ultrasonic horn.

5. The system of claim 1 wherein the component part is provided as a turbine blade, and
    wherein the attachment portion of the ultrasonic horn is provided as a female part and the attachment portion of the turbine blade is provided as a male part sized and shaped to mate and engage with the female part.

6. The system of claim 1 wherein the ultrasonic horn is adapted to receive an attachment portion of the component part disposed along the longitudinal axis of the component part.

7. The system of claim 6 wherein the attachment portion of the ultrasonic horn is disposed along the longitudinal axis of the ultrasonic horn.

8. The system of claim 7 wherein the longitudinal axis of the ultrasonic horn is adapted to be coaxial to the component part.

9. A method for ultrasonic assisted electrical discharge machining comprising the steps of:
   providing a component part having a longitudinal axis, a half wavelength resonant frequency along the longitudinal axis and an attachment portion;
   providing an ultrasonic horn having a longitudinal axis, a half wavelength resonant frequency along the longitudinal axis and an attachment portion, wherein the half wavelength resonant frequency of the ultrasonic horn is provided to match the half wavelength resonant frequency of the component part;
   wherein one of the attachment portion of the component part and the attachment portion of the ultrasonic horn comprises a male part and the other one of the attachment portion of the component part and the attachment portion of the ultrasonic horn comprises a female part sized and shaped to mate and engage one another when the component part and the ultrasonic horn are at generally the same temperature;
   mating the male part and the female part together to join the component part and the ultrasonic horn; and
   electrically discharge machining and ultrasonically vibrating the ultrasonic horn and the component part joined thereto at the half wavelength resonant frequency of the ultrasonic horn and the component part.

10. The method of claim 9 wherein the step of ultrasonically vibrating the ultrasonic horn is performed by a source of ultrasonic energy which imparts ultrasonic vibrations to the ultrasonic horn.

11. The method of claim 9 wherein the female part has generally the same shape as and smaller dimensions than the male part when the component part and the ultrasonic horn are at generally the same temperature.

12. The method of claim 9 wherein the one of the component part and the ultrasonic horn whose attachment portion comprises the female part is formed of a material having a greater coefficient of thermal expansion than does the one of the component part and the ultrasonic horn whose attachment portion comprises the male part, and wherein the mating step comprises the steps of:
   heating the component part and the ultrasonic horn such that the female part expands to a greater extent that the male part expands;
   fitting the male part into the female part; and
   cooling the component part and the ultrasonic horn such that the female part and the male part shrink such that the male part is engaged within the female part.

13. The method of claim 12 wherein the attachment portion of the component part comprises the male part and wherein the attachment portion of the ultrasonic horn comprises the female part.

14. The method of claim 13 wherein the component part comprises a turbine blade and wherein the male part comprises a tang.

15. The method of claim 13 wherein the component part is formed from steel and the ultrasonic horn is formed from titanium or aluminum.

16. The method of claim 9 wherein the attachment portion of the component part is disposed along the longitudinal axis of the component part.

17. The method of claim 16 wherein the attachment portion of the ultrasonic horn is disposed along the longitudinal axis of the ultrasonic horn.

18. The method of claim 17 wherein the longitudinal axis of the component part and the longitudinal axis of the ultrasonic horn are coaxial.

19. The method of claim 9 wherein the component part is provided as a turbine blade, and
   wherein the attachment portion of the ultrasonic horn is provided as a female part and the attachment portion of the turbine blade is provided as a male part sized and shaped to mate and engage with the female part.

20. A system for ultrasonic assisted electrical discharge machining of a turbine blade having a longitudinal axis, a half wavelength resonant frequency along the longitudinal axis and an attachment portion, the system comprising:
   an ultrasonic horn having a longitudinal axis, a half wavelength resonant frequency along the longitudinal axis and an attachment portion;
   wherein the half wavelength resonant frequency of the ultrasonic horn is provided to match the half wavelength resonant frequency of the turbine blade;
   an attachment portion of the ultrasonic horn provided as a female part; and
   wherein an attachment portion of the turbine blade is provided as a male part sized and shaped to mate and engage with the female part on said ultrasonic horn.

21. The system of claim 20 wherein the female part is formed of a material having a greater coefficient of thermal expansion than the male part.

22. The system of claim 20 wherein the male part is provided as a tang.

23. The system of claim 20 wherein the male part is disposed along the longitudinal axis of the ultrasonic horn.

24. The system of claim 20 further comprising a source of ultrasonic energy which imparts ultrasonic vibrations to the ultrasonic horn.

* * * * *